J. B. ARTHUR.
DEMOUNTABLE RIM.
APPLICATION FILED MAR. 2, 1914.
1,139,151.
Patented May 11, 1915.
2 SHEETS—SHEET 1.
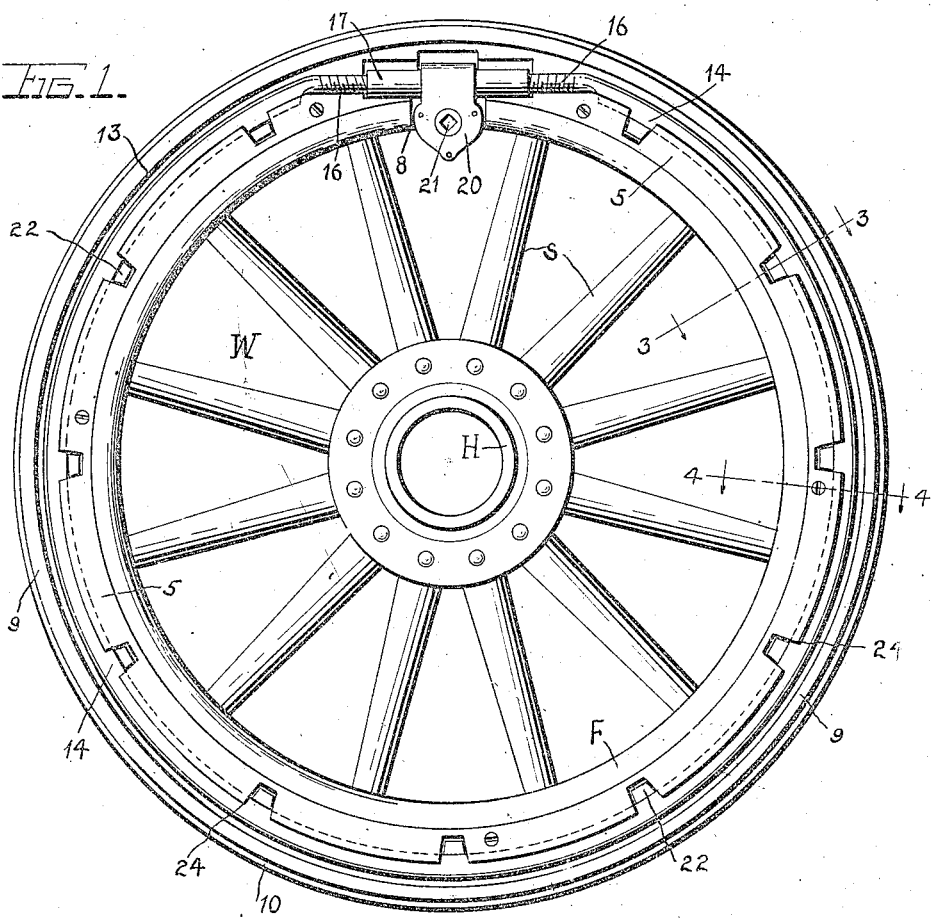
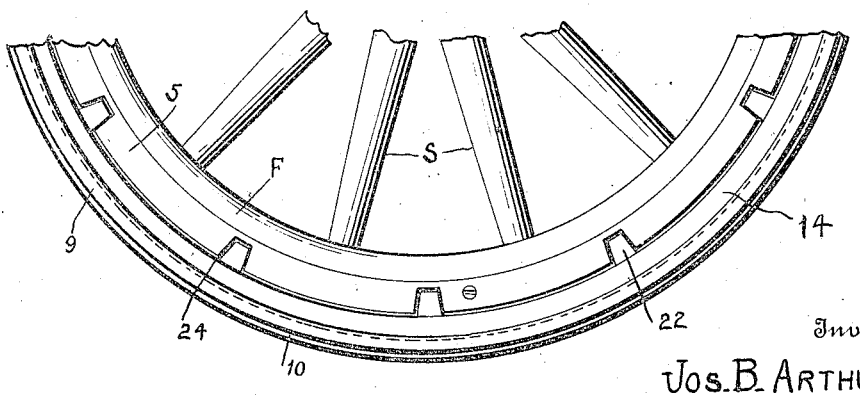
Inventor,
Jos. B. Arthur.

J. B. ARTHUR.
DEMOUNTABLE RIM.
APPLICATION FILED MAR. 2, 1914.
1,139,151.
Patented May 11, 1915.
2 SHEETS—SHEET 2.
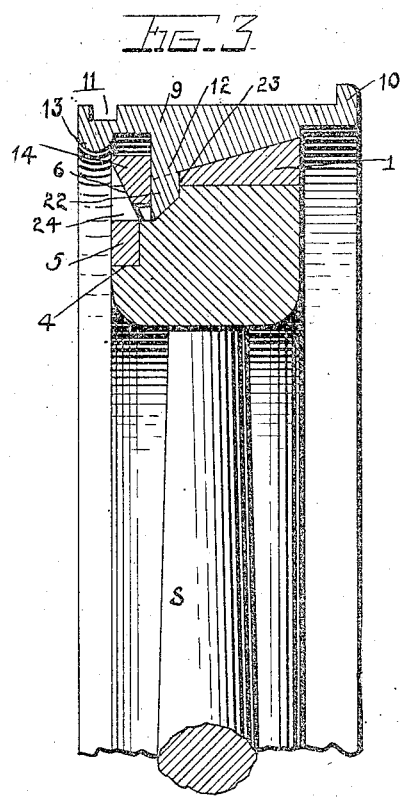
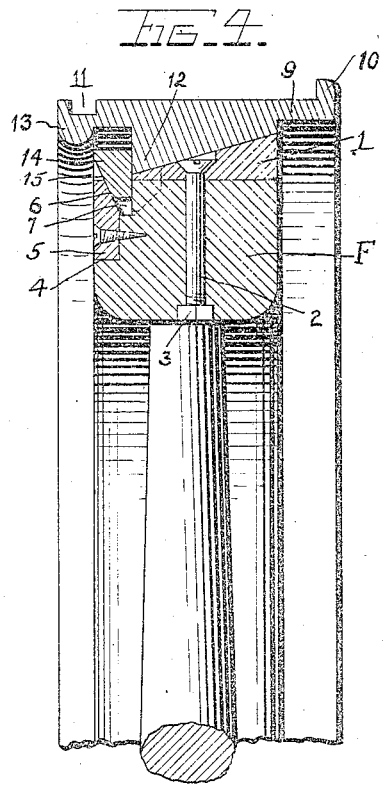
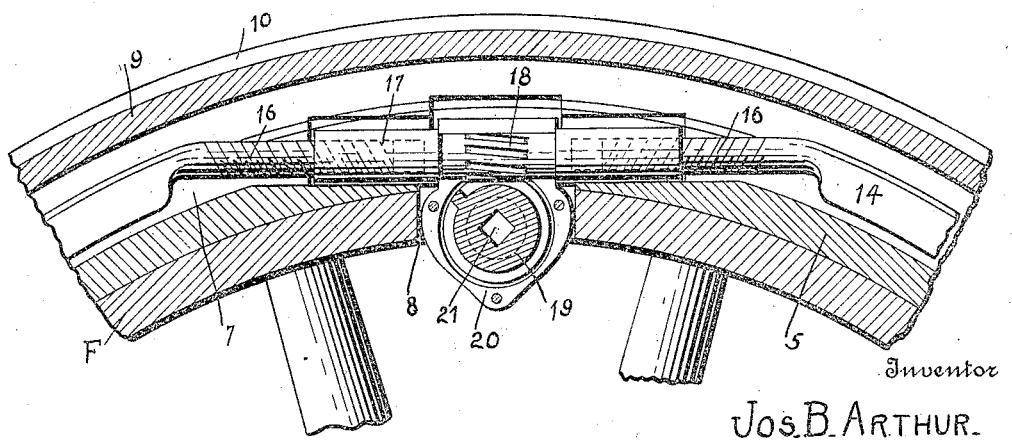
Witnesses
Edwin B. Hunt
Inventor
Jos. B. Arthur.
By
Attorneys

UNITED STATES PATENT OFFICE.

JOSEPH B. ARTHUR, OF HUTCHINSON, KANSAS.

DEMOUNTABLE RIM.

1,139,151. Specification of Letters Patent. Patented May 11, 1915.

Application filed March 2, 1914. Serial No. 822,007.

*To all whom it may concern:*

Be it known that I, JOSEPH B. ARTHUR, a citizen of the United States, residing at Hutchinson, in the county of Reno and State of Kansas, have invented certain new and useful Improvements in Demountable Rims; and I do declare the following to be a full, clear, and exact description of the invention, such as will enable others skilled in the art to which it appertains to make and use the same.

This invention relates to improvements in demountable rims for use especially in connection with automobile wheels and the primary object of the same is to provide an extremely simple, strong, and durable device of this character which may be quickly and easily attached or detached.

A secondary object is to construct the rim and its co-acting parts in such a manner as to allow said rim to be readily removed with the necessity of but one mechanical movement.

Still another object is to construct the rim in such a manner as to render standard, quick detachable and clencher tires readily applicable thereto and removable therefrom without the necessity of first removing the rim.

With the above objects in view, the invention resides in certain novel features of construction and combination herein described and claimed and shown in the drawings wherein:

Figure 1 is a side elevation of an automobile wheel showing the application of my improved demountable rim thereto, the rim being secured in position; Fig. 2 is a similar view of a portion of a wheel showing the parts in the position which they assume when detaching the rim; Fig. 3 is a transverse section on the line 3—3 of Fig. 1; Fig. 4 is a similar view on the line 4—4 thereof; and Fig. 5 is a detail vertical section through a portion of the felly and rim and showing more particularly the operating mechanism for expanding and contracting the clamping or wedging band to be described.

In the accompanying drawings, I have shown my improved demountable rim as applied to an automobile wheel W which comprises the usual hub H, spokes S and felly F. The periphery of the felly F is provided with a felly band 1 which is wedge-shaped in cross section (see Figs. 3 and 4) and is secured in position upon said felly by means of bolts 2 which pass through said band and said felly and receive nuts 3 on their inner ends. By reference to Figs. 3 and 4, it will be seen that the band 1 is tapered upon its outer face only, while its inner face lies parallel to the axis of the wheel W. Thus it will be seen that by slight alterations, to be hereinafter described, the wedge-shaped bands 1, may be applied to automobile wheels of usual construction.

The outer edge of the felly F is provided with an annular groove or recess 4 in which is rigidly secured a wedging ring 5 which, as shown, is tapered on its inner side as shown at 6, said tapered portion extending from the outer edge of said ring inwardly to a suitable point and containing throughout the circumference of the ring 5. The outer face of the felly F is further recessed as at 7 for a purpose to appear, said recess extending throughout the circumference of said felly and terminating at its opposite ends in an enlarged recess 8 in which the operating mechanism to be described is located.

The rim 9 is here shown as formed upon its periphery, with an annular bead or flange 10 on its inner edge, while its outer edge is provided with a continuous groove 11, said flange and groove being adapted for co-action with the usual tire clamping rings (not shown). The inner side of the rim 9 is provided at its central portion with an integral wedging band 12 which, as clearly shown in Figs. 3 and 4, is beveled on its inner side and co-acts with the beveled portion of the felly band 1, said band 12 and the rim 9 being secured in position in a manner to appear. As clearly shown in the drawings, the band 12 terminates a suitable distance from the inner and outer edges of the rim 9 and said rim is provided on its outer edge with an inwardly extending bead 13 which extends throughout the circumference of said rim.

Slidably mounted between the bead 13 and the outer edge of the wedge band 12 is a clamping or wedging ring 14 which, as clearly shown in Figs. 4 and 5, is beveled on its outer side as at 15 for co-action with the beveled portion 6 of the ring 5. The opposite ends of the ring 14 are provided with oppositely threaded extensions 16 which are engaged with internally threaded sockets formed in the opposite ends of a turn buckle 17 which is reduced at its central portion and provided with a plurality of worm teeth 18 with which a laterally extending worm 19 meshes. The worm 19 is revolubly mounted in a suitable yoke 20 which extends inwardly through the recess 8 and is provided with a polygonal opening 21 for the reception of a suitable tool by which it may be rotated.

For the sake of preventing the rim 9 from creeping upon the felly band 1, I provide the wedging band 12 with inwardly extending studs 22 which are adapted to engage notches 23 formed in the outer edge of said felly band. The wedging ring 5 is provided with notches 24 through which said lugs 22 may freely pass when the rim is being removed or applied in a manner to appear.

When the rim is in position upon the wheel, the tapered inner side of the wedging band 12 is in contact with the tapered outer face of the felly band 1 and the clamping or wedging ring 14 is contracted by means of the turn buckle 17, to cause its tapered outer side 15 to contact with the tapered inner side 6 of the ring 5 and thereby draw the tapered faces of the elements 1 and 12 into binding contact. When the ring 14 stands in this position, its inner edge will be forced into the space 7, while its outer edge will move inwardly within the space between the outer edge of the band 12 and the bead 13. Thus it will be seen that the rim 9 is rigidly secured in position upon the wheel. When, however, it becomes necessary to remove the rim, a suitable tool may be inserted in the opening 21 and the worm 19 may thereby be rotated in such a direction as to force the meeting ends of the wedging ring 14 outwardly and thereby expand said ring to a sufficient extent to allow it to pass freely over the outer edge of the ring 5, whereupon the entire rim may be removed. If now it should become necessary to remove the wedging ring 15 from the rim 9, it is simply necessary to rotate the worm 19 in the proper direction to draw the ends of said ring together and thus contract said ring, whereupon, it may be readily disengaged.

From the herein described construction, it will be clearly seen that I have produced a very simple, yet efficient demountable rim which is designed primarily for use in connection with automobile wheels and upon which standard tires may be employed. It will be further seen that the tires may be removed from the rims without the necessity of first removing said rims. This I consider an important feature of the invention, since it adapts the rim for use either as a demountable rim or as a rigid rim.

From the foregoing description, taken in connection with the accompanying drawings, the construction and operation of the invention will be readily understood without requiring a more extended explanation.

Although, I have described my invention with considerable minuteness, I do not wish to be limited to details of construction other than those amplified in the appended claims.

Having thus described my invention, what I claim as new and desire to secure by Letters-Patent is:

1. In a device of the class described, the combination with the felly of a wheel having the outer side face thereof offset and continuing therearound, a felly band applied to the outer periphery of said felly and having a beveled outer periphery and a rim applied to said felly band, the inner periphery of said rim being beveled coincident to the inclination of the outer periphery of said band; of a ring removably secured in the offset portion of said felly, the inner face of a portion of said ring being beveled and spaced from portions of the rim and felly band, a split ring disposed in the space between the beveled portions of the aforesaid ring and the adjacent side of the rim and felly band, the outer face of said split ring being beveled coincident to the beveling of the portion of the first mentioned ring, and means for contracting said ring in the space in which the same is seated whereby to cause the rim to bind tightly on the felly band and remain secured in position.

2. In a device of the class described, the combination with the felly of a wheel, the outer side face of which is offset a plurality of times continuing therearound, a felly band removably applied on the outer periphery of said felly and having its outer periphery beveled outwardly, said felly band and felly being provided with registering notches at predetermined points therein, and a rim applied to the outer periphery of said felly band, the inner periphery of the rim being beveled coincident to the beveling of the outer periphery of said band; of a ring removably applied to the side of the felly in one of the offset portions thereof, the inner face of a portion of said ring being beveled outwardly and forming an outer wall for the remaining offset portion of the felly, depending lugs carried on the rim and received in the registering notches of the felly and felly band, said ring being also provided with notches alining with the aforesaid registering notches, a split ring applied in the last mentioned offset portion of the felly between the beveled inner wall of the first mentioned ring and the outer faces of the rim and felly, the outer face of said split ring being beveled coincident to the beveling of the inner face of the first mentioned ring, and means for contracting said split ring whereby to cause the rim to be frictionally seated and retained on the felly band.

3. The combination with the felly of a wheel, having spaced notches therein of a wedge shaped band mounted upon its periphery, its narrow edge being also provided with spaced notches, registering with the aforesaid notches a ring secured to one side of said felly and having notches registering with those in said band and felly, the inner side of said ring being beveled, a rim having an annular wedge shaped portion on its inner side in contact with the wedge shaped band on said felly, lugs extending inwardly from said rim and entering the aforesaid registering notches in the wedge shaped band and the felly, said rim having spaced from the wide edge of its wedge shaped portion, an annular bead, a wedge shaped clamping ring movably mounted between said bead and said wedge shaped portion of the rim, and means for contracting said wedge shaped clamping ring to cause it to contact with the beveled face of the ring carried by said felly, whereby the wedging portions of said rim and said band are forced into binding contact.

In testimony whereof I have hereunto set my hand in presence of two subscribing witnesses.

JOSEPH B. ARTHUR.

Witnesses:
VAN M. MARTIN,
JAMES N. FARLEY.